(12) United States Patent
Nojiri

(10) Patent No.: US 7,798,930 B2
(45) Date of Patent: Sep. 21, 2010

(54) ENGINE STARTING DEVICE

(75) Inventor: Tetsuharu Nojiri, Hamamatsu (JP)

(73) Assignee: Suzuki Motor Corporation, Hamamatsu-Shi, Shizuoka-Ken (JP)

( * ) Notice: Subject to any disclaimer, the term of this patent is extended or adjusted under 35 U.S.C. 154(b) by 122 days.

(21) Appl. No.: 11/862,828

(22) Filed: Sep. 27, 2007

(65) Prior Publication Data
US 2008/0085800 A1 Apr. 10, 2008

(30) Foreign Application Priority Data
Oct. 6, 2006 (JP) .............................. 2006-275641

(51) Int. Cl.
*F16H 7/02* (2006.01)
(52) U.S. Cl. .............................. 474/93; 474/46; 474/69; 474/157; 474/205; 74/7 C; 74/7 E; 123/48 B; 123/179.2; 123/185.2; 123/185.3; 123/196 R
(58) Field of Classification Search .................. 474/93, 474/153, 152, 158, 159, 8, 133; 123/179.1, 123/179.9, 179.12, 185.2, 185.5, 185.6, 185.9, 123/90.17, 195 C, 196 R; 74/7 A, 7 B, 7 C, 74/7 D, 7 E; 185/41 A, 39; *F02N 1/00, 3/02, F02N 15/02, 11/00; F16H 55/56; F02B 3/02; B62M 9/08*
See application file for complete search history.

(56) References Cited

U.S. PATENT DOCUMENTS 2,827,225 A * 3/1958 Killian ........................ 416/60
3,129,597 A * 4/1964 Prior ............................ 474/46
3,659,471 A * 5/1972 Marsch ........................ 474/93
5,591,100 A * 1/1997 Hayashi et al. ............... 477/44
2004/0102267 A1* 5/2004 Murakami et al. ........... 474/69
2005/0187057 A1* 8/2005 Lou ........................... 474/245
2006/0030454 A1* 2/2006 Uchisasai et al. ............. 477/77
2007/0200315 A1* 8/2007 Ogawa et al. ............... 280/293

FOREIGN PATENT DOCUMENTS

| FR | 2741398 A1 | * | 5/1997 |
| JP | 62-048960 A | | 3/1987 |
| JP | 3518709 B | | 6/1997 |
| JP | 09144634 A | * | 6/1997 |
| JP | 2004019604 A | * | 1/2004 |

* cited by examiner

*Primary Examiner*—Robert A Siconolfi
*Assistant Examiner*—San Aung
(74) *Attorney, Agent, or Firm*—Barnes & Thornburg LLP

(57) ABSTRACT

A fixed pulley face of a drive V-pulley of a V-belt type continuously variable transmission includes a belt sliding contact disc having a conical belt sliding contact surface and fixed to a crankshaft so as to be integrally rotated, and a cooling fan fixed to the crankshaft so as to be integrally rotated in adjacent to a side surface opposite to the belt sliding contact surface of the belt sliding contact disc, and a starter driven gear is formed in an outer peripheral portion of the cooling fan.

7 Claims, 1 Drawing Sheet

ENGINE STARTING DEVICE

CROSS-REFERENCE TO RELATED APPLICATIONS

This application is a U.S. Application based upon and claiming the benefit of priority to Japanese Application JP 275641/2006, filed on Oct. 6, 2006, the contents of which are incorporated herein by reference.

BACKGROUND OF THE INVENTION

1. Field of the Invention

The present invention relates to an engine starting device in a vehicle structured such that a rotation of a crankshaft of an engine is shifted by a V-belt type continuously variable transmission so as to be transmitted to a driving wheel, such as a scooter type vehicle or a small all terrain vehicle.

2. Related Art

In this kind of starting device, as described in Japanese Patent Application Laid-Open Publication No. 62-48960 and Japanese Patent Publication No. 3518709, a starter driven gear is integrally formed in an outer peripheral portion of a drive V-pulley of the V-belt type continuously variable transmission integrally provided in the crankshaft of the engine. In addition, a starter drive gear driven by a human power or a starter motor is arranged near the drive V-pulley. At a time of starting the engine, a starter driven gear is rotationally driven by the starter drive gear, so that an engine is started by run-up rotating the crankshaft.

As described in the prior art publications mentioned above, in the conventional starting device, an outer diameter of the drive V-pulley is set sufficiently large so as to prevent a tooth shape of the starter driven gear formed in the outer peripheral portion of the drive V-pulley from lapping over a belt sliding contact surface. Further, because if the tooth shape of the starter driven gear laps over the belt sliding contact surface of the drive V-pulley, a side surface of the V-belt tends to wear and a durability of the V-belt is significantly lowered.

However, if the outer diameter of the drive V-pulley is made sufficiently large as mentioned above, a size of an engine case (a crankcase) in which the V-belt type continuously variable transmission is accommodated is enlarged and compactness is deteriorated, thus being inconvenient. Furthermore, if the outer diameter of the drive V-pulley is enlarged, a tooth number of the starter driven gear is necessarily increased, and it is necessary to reduce the tooth number of the starter drive gear at that degree.

Accordingly, it is difficult to obtain a proper starter gear ratio, and there is a tendency that it is hard to start the engine particularly in a recoil type starting device in which an engine start is executed by pulling a rope by a hand so as to rotate a starter drive gear.

SUMMARY OF THE INVENTION

The present invention was conceived in consideration of the circumstances encountered in the prior art mentioned above, and an object of the present invention is to provide an engine starting device capable of improving durability of a V-belt without enlarging an outer diameter of a drive V-pulley of a V-belt type continuously variable transmission so as to achieve a compact structure of an engine case, thereby achieving proper setting of a starter gear ratio and realizing easy manufacture of an engine.

The above and other objects can be achieved according to the present invention by providing an engine starting device in which a starter driven gear is formed in a drive V-pulley of a V-belt type continuously variable transmission provided for a crankshaft to be integrally rotated, wherein a fixed pulley face of the drive V-pulley is provided with a belt sliding contact disc having a conical belt sliding contact surface and fixed to the crankshaft so as to be integrally rotated, and a cooling fan fixed to the crankshaft so as to be integrally rotated in adjacent to a side surface opposite to the belt sliding contact surface of the belt sliding contact disc, and the starter driven gear is formed in an outer peripheral portion of the cooling fan.

In a preferred embodiment of the above aspect, it may be desired that the belt sliding contact disc is formed in conical plate shape by a plate-shaped material, the cooling fan includes a plurality of vane members integrally provided in a side surface of a disc main body, the cooling fan is fixed to a crankshaft in such a manner that the vane members are directed to an opposite side to the belt sliding contact disc, and the starter driven gear is integrally formed in an outer peripheral portion of the disc main body.

It may be also desired that the disc main body has a side surface opposite to the belt sliding contact disc, and the side surface is formed in conical surface shape having a constant small gap with respect to the belt sliding contact disc side surface.

The starting device may be formed to have a recoil structure, a starter drive gear is moved in an axial direction so as to be jumped into and engaged with the starter driven gear at a time of starting the engine, the starter drive gear is formed of a synthetic resin material, and the cooling fan is formed of a light alloy material.

According to the engine starting device of the present invention of the characters mentioned above, the belt sliding contact disc and the cooling fan, which constitute the fixed pulley face of the drive V-pulley, are arranged so as to be aligned in an axial direction of the crankshaft, and the starter driven gear is formed in the outer peripheral portion of the cooling fan. Therefore, the belt sliding contact surface of the belt sliding contact disc and the tooth shape of the starter driven gear are not overlapped, and thus, it is not necessary to enlarge the outer diameter of the drive V-pulley. Accordingly, it is possible to improve a durability of the V-belt, and it is also possible to improve the compactness of the engine case and proper setting of a starter gear ratio.

BRIEF DESCRIPTION OF THE DRAWING

Single drawing of FIG. 1 is a partial cross sectional view of an engine case showing an essential portion of an engine starting device according to the present invention.

DESCRIPTION OF THE PREFERRED EMBODIMENT

Figure 1:
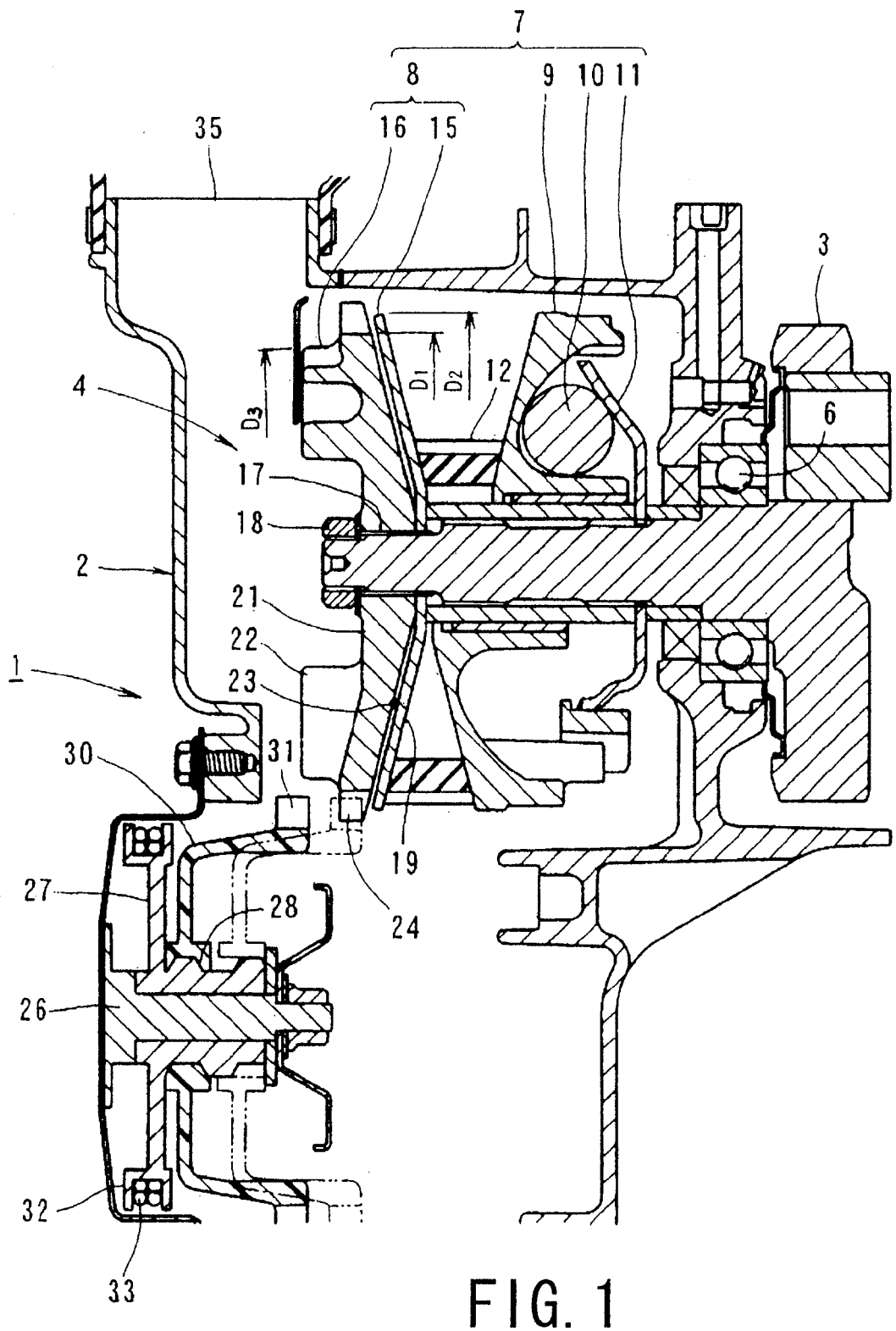

A preferred embodiment of the present invention will be described hereunder with reference to the accompanying drawing of FIG. 1.

With reference to FIG. 1, an engine case 2 is provided for a power unit of a small all terrain vehicle in which a rotation of a crankshaft 3 is shifted by a V-belt type continuously variable transmission 4 so as to be transmitted to a driving wheel, and an upper side in FIG. 1 corresponds to a front side of the vehicle.

The crankshaft 3 is rotatably pivoted to a front side of an inner portion of the engine case 2 by a bearing 6 so as to extend along a vehicle width direction, and a drive V-pulley 7 of the V-belt type continuously variable transmission 4 is provided, for example, in a left end of the crankshaft 3 so as to be integrally rotated. A basic structure and an operation of the V-belt type continuously variable transmission 4 are the same as those of the apparatus used in a general scooter type vehicle or the like.

The drive V-pulley 7 includes a fixed pulley face 8 fixed to the crankshaft 3 so as to be integrally rotated, a pulley face 9 freely sliding in an axial direction of the crankshaft 3 and rotationally integrated with the crankshaft 3, and a weight roller 10 and a roller plate 11 moving the movable pulley face 9 in an axial direction in correspondence to a rotating speed of the crankshaft 3.

A V-belt 12 is wound around the fixed pulley face 8 and the movable pulley face 9, and an effective diameter of the V-belt is continuously changed in accordance with the axial position of the movable pulley face 9. In this manner, the continuously variable shift is performed.

Further, the fixed pulley face 8 is structured as a composite part including a belt sliding contact disc 15 and a cooling fan 16. The belt sliding contact disc 15 and the cooling fan 16 are both engaged with a spline 17 formed near a left end of the crankshaft 3 so as to be fastened by a nut 18, and are fixed to the crankshaft 3 so as to be integrally rotated.

The belt sliding contact disc 15 is formed in conical plate shape by a plate-like material such as a steel plate or the like, and has a conical surface shaped belt sliding contact surface 19 in a surface of the movable pulley face 9 side (right side surface in this case).

On the other hand, the cooling fan 16 is formed, for example, by an aluminum light alloy material, includes a disc main body 21 which is adjacent to a side surface opposite to the belt sliding contact surface 19 of the belt sliding contact disc 15 (left side surface in this case), and is integrally provided with a plurality of vane members 22 in the left side surface.

The vane members 22 are directed to an opposite side to the belt sliding contact disc 15, and the side surface (right side surface) opposing to the belt sliding contact plate 15 of the disc main body 21 is formed in conical surface shape having a constant small gap 23 with respect to the left side surface of the belt sliding contact disc 15.

Further, a starter driven gear 24 is integrally formed in an outer peripheral portion of the disc main body 21 of the cooling fan 16. A tooth shape of the starter driven gear 24 overlaps in a radial direction with respect to the belt sliding contact surface 19 of the belt sliding contact disc 15. In other words, a diameter D1 of a root circle of the starter driven gear 24 becomes smaller than a maximum diameter D2 of the belt sliding contact surface 19.

In this case, the starting device 1 is, for example, a recoil type. A starter shaft 26 which is in parallel to the crankshaft 3 is installed in an intermediate portion of the engine case 2, and a starter rope pulley 27 is rotatably pivoted to the starter shaft 26.

Furthermore, a trapezoidal thread 28 is formed in an outer periphery of a boss portion of the starter rope pulley 27, and a starter drive gear 30 is threaded onto this thread. The starter drive gear 30 is formed by a synthetic resin material, and a tooth shape 31 engaging with the starter driven gear 24 is formed in an outer peripheral portion of the starter driven gear 30.

A starter rope 33 is wound around a rope winding groove 32 formed in an outer peripheral portion of the starter rope pulley 27. A free end of the rope comes out to the outside of the engine case 2 and is provided with a pulling handle (not shown). The starter rope pulley 27 is rotated by pulling the pulling handle at a time of starting the engine, the starter drive gear 30 is moved to a right side in the axial direction on the basis of a thrust operation of the trapezoidal thread 28 at an initial rotating time, and the starter drive gear 30 (31) jumps into the starter driven gear 24 side so as to be engaged therewith. Accordingly, the starter driven gear 24 is rotationally driven by the starter drive gear 30, and a whole of the drive V-pulley 7 and the crankshaft 3 are run-up rotated, thus starting the engine.

When the engine is started and the drive V-pulley 7 is rotated, an ambient air is sucked into the inside of the engine case 2 through an air dust 35 arranged in a front side of the engine case 2 on the basis of a suction force of the cooling fan 16, and the ambient air flows, as a cooling air, backward in the inside of the engine case 2. Accordingly, the V-belt type indefinite variable speed apparatus 4, which generates a friction heat, is cooled.

In the starting device 1 structured as mentioned above, the fixed pulley face 8 of the drive V-pulley 7 is constructed as a composite part including the belt sliding contact disc 15 and the cooling fan 16, these two members 15 and 16 are arranged so as to be aligned in the axial direction of the crankshaft 3, and the starter driven gear 24 is formed in the outer peripheral portion of the cooling fan 16 (disc main body 21), and accordingly, it is possible to avoid the matter that the tooth shape of the starter driven gear 24 directly laps over the belt sliding contact surface 19 of the belt sliding contact disc 15 without enlarging the outer diameter of the drive V-pulley 7 (fixed pulley face 8). Therefore, the durability of the V-belt 12 can be improved while keeping a compact structure of the engine case 2.

Furthermore, it is possible to freely select the tooth number of the starter driven gear 24 independently from the position of the belt sliding contact surface 19. Therefore, the starter gear ratio can be properly set. Particularly, when the recoil type starting device such as the starting device 1 is used, an operating load at the starting time and a stroke for pulling the rope or the like can be properly set.

In addition, since the belt sliding contact disc 15 constituting the drive V-pulley 7 is formed to be thin by using the plate-like material such as steel plate or the like, and the cooling fan 16 is formed by the aluminum light alloy material, it is possible to keep the whole weight of the drive V-pulley 7 light while forming the belt sliding contact surface 19 with the steel plate so as to improve the abrasion resistance, as well as improving a productivity of both the members 15 and 16. This is a very effective measure for reducing a rotation mass in the drive V-pulley 7, which is a high-speed rotating member.

For example, in the case that the belt sliding contact disc 15 and the cooling fan 16 are integrally formed by the aluminum light alloy material such as in the conventional technique, the belt sliding contact surface 19 is made of the light alloy and is inferior in the abrasion resistance. On the other hand, in the case that the whole of the drive V-pulley 7 is made of the steel, the weight becomes very large.

Still furthermore, the belt sliding contact disc 15 is formed in conical plate shape, the cooling fan 16 is structured such that a plurality of vane members 22 are integrally provided in the side surface of the disc main body 21, and the side surface opposing to the belt sliding contact disc 15 of the disc main body 21 is formed in conical surface shape having the constant small gap 23 with respect to the side surface of the belt sliding contact disc 15.

Accordingly, a conical overlapping margin can be provided between the belt sliding contact disc 15 and the cooling fan 16 (disc main body 21) so as to significantly narrow the distance in the axial direction between both the members 15 and 16.

Thus, it is possible to contribute enormously to compactness in the width direction of the engine case 2.

In addition, since the starter drive gear 30 is formed by the synthetic resin material, and the cooling fan 16 (starter driven gear 24) is formed by the light alloy material, the weight is saved and productivity of both the members 16 (24) and 30 can be enhanced, and the abrasion of both the members 16 (24) and 30 can be achieved, thus improving the durability.

Particularly, in the case of the V-belt type continuously variable transmission 4 in which the inner portion of the casing 2 is air cooled and dried, it is impossible to perform wet lubricating between the starter drive gear 30 and the starter driven gear 24 by oil. Accordingly, in order to improve the abrasion resistance, it is effective to make one of the gears of the synthetic resin.

The present invention is not limited to the described embodiment and many other changes and modifications may be made without departing from the scopes of the appended claims. For example, the starting device according to the present invention is not limited to a V-belt type continuously variable transmission for a vehicle, but can be applied to a V-belt type continuously variable transmission for another intended use.

What is claimed is:

1. An engine starting device in which a starter driven gear is formed in a drive V-pulley of a V-belt type continuously variable transmission provided for a crankshaft to be integrally rotated,
    wherein a fixed pulley face of the drive V-pulley is provided with a belt sliding contact disc having a conical belt sliding contact surface and fixed to the crankshaft so as to be integrally rotated, and a cooling fan fixed to the crankshaft so as to be integrally rotated in adjacent to a side surface opposite to the belt sliding contact surface of the belt sliding contact disc, and the starter driven gear is formed in an outer peripheral portion of the cooling fan, and
    wherein a root circle of the starter driven gear has a diameter (D1) smaller than a maximum diameter (D2) of the conical belt sliding contact surface.

2. The engine starting device according to claim 1, wherein the belt sliding contact disc is formed in conical plate shape by a plate-shaped material, the cooling fan includes a plurality of vane members integrally provided in a side surface of a disc main body, the cooling fan is fixed to a crankshaft in such a manner that the vane members are directed to an opposite side to the belt sliding contact disc, and the starter driven gear is integrally formed in an outer peripheral portion of the disc main body.

3. The engine starting device according to claim 2, wherein the disc main body has a side surface opposite to the belt sliding contact disc, and the side surface is formed in conical surface shape having a constant small gap with respect to the belt sliding contact disc side surface.

4. The engine starting device according to claim 2, wherein the starting device is formed to have a recoil structure, a starter drive gear is moved in an axial direction so as to be jumped into and engaged with the starter drive gear at a time of starting the engine, the starter drive gear is formed of a synthetic resin material, and the cooling fan is formed of a light alloy material.

5. The engine starting device according to claim 1, wherein the cooling fan has a maximum diameter (D3) smaller than the diameter (D1) of the root circle of the starter driven gear.

6. The engine starting device according to claim 1, wherein a disc main body is integrally provided with the cooling fan and the starter driven gear, the disc main body is formed of a light alloy metal, and the belt sliding contact disc is formed of a steel material.

7. The engine starting device according to claim 6, wherein a constant gap is formed between the disc main body and the belt sliding contact disc.

\* \* \* \* \*